United States Patent
Tokiwa et al.

(10) Patent No.: US 9,217,067 B2
(45) Date of Patent: Dec. 22, 2015

(54) METHOD FOR PRODUCING POLYPROPYLENE-BASED RESIN FOAMED BLOW-MOLDED ARTICLE

(75) Inventors: Tomoo Tokiwa, Kanuma (JP); Masahiro Gomibuchi, Shimotsuke (JP)

(73) Assignee: JSP CORPORATION, Tokyo (JP)

( * ) Notice: Subject to any disclaimer, the term of this patent is extended or adjusted under 35 U.S.C. 154(b) by 601 days.

(21) Appl. No.: 13/636,743

(22) PCT Filed: Feb. 10, 2011

(86) PCT No.: PCT/JP2011/052846
§ 371 (c)(1),
(2), (4) Date: Oct. 16, 2012

(87) PCT Pub. No.: WO2011/118281
PCT Pub. Date: Sep. 29, 2011

(65) Prior Publication Data
US 2013/0032963 A1    Feb. 7, 2013

(30) Foreign Application Priority Data

Mar. 24, 2010 (JP) .................. 2010-068941

(51) Int. Cl.
*B29C 44/34* (2006.01)
*C08J 9/14* (2006.01)
(Continued)

(52) U.S. Cl.
CPC .............. *C08J 9/14* (2013.01); *B29C 49/0005* (2013.01); *C08L 23/10* (2013.01); *B29C 49/04* (2013.01);
(Continued)

(58) Field of Classification Search
USPC ..................... 264/45.1, 50, 51, 454
See application file for complete search history.

(56) References Cited

U.S. PATENT DOCUMENTS

2007/0031622 A1   2/2007   Imanari et al.
2008/0058437 A1   3/2008   Burgun et al.
2008/0261016 A1   10/2008  Tamada et al.

FOREIGN PATENT DOCUMENTS

CN    101531770 A    9/2009
EP      1749635 A2   2/2007
(Continued)

OTHER PUBLICATIONS

Supplementary European Search Report dated Jun. 24, 2014, for EP 11759089.
(Continued)

*Primary Examiner* — Stella Yi
(74) *Attorney, Agent, or Firm* — Bacon & Thomas, PLLC

(57) ABSTRACT

Provided is a method that can improve formability and blow moldability of a foamed parison as compared with conventional production method and can produce a polypropylene-based resin foamed blow-molded article having excellent uniformity of wall thickness over a wide range of its density. The method comprises kneading a polypropylene-based resin with a physical foaming agent, extruding the thus obtained foamable molten resin through a die to obtain a foamed parison in a softened state, placing the foamed parison between molds and then blow-molding the foamed parison and is characterized in that the polypropylene-based resin comprises a polypropylene-based resin (A) satisfying specific requirements (1) to (3) and a polypropylene-based resin (B) satisfying a specific requirement (4), when the polypropylene-based resins (A) and (B) are each subjected to dynamic viscoelasticity measurement in which an oscillation strain is applied thereto at a temperature of 190° C., and that the mixing ratio by weight (A:B) of the resin (A) to the resin (B) is in the range of 100:0.5 to 100:5.

10 Claims, 2 Drawing Sheets

(51) Int. Cl.
*B29C 49/00* (2006.01)
*C08L 23/10* (2006.01)
*B29C 49/04* (2006.01)
*B29C 49/22* (2006.01)
*B29K 23/00* (2006.01)
*B29K 105/04* (2006.01)
*C08K 3/34* (2006.01)

(52) U.S. Cl.
CPC ........... *B29C 49/22* (2013.01); *B29C 2791/006* (2013.01); *B29C 2791/007* (2013.01); *B29K 2023/10* (2013.01); *B29K 2105/04* (2013.01); *C08J 2323/12* (2013.01); *C08K 3/34* (2013.01); *C08L 2205/02* (2013.01)

(56) References Cited

FOREIGN PATENT DOCUMENTS

| | | |
|---|---|---|
| JP | 11-246713 A | 9/1999 |
| JP | 2001-018283 A | 1/2001 |
| JP | 2002-012717 A | 1/2002 |
| JP | 2003-236918 A | 8/2003 |
| JP | 3707779 B2 | 10/2005 |
| JP | 2009-299016 A | 12/2009 |

OTHER PUBLICATIONS

Jahani et al., "Rheological and Mechanical Study of Polypropylene Ternary Blends for Foam Application", Iranian Polymer Journal 14 (4), 2005, 361-370. (Cited in EP Search Report).

McCallum et al., "The Rheological and Physical Properties of Linear and Branched Polypropylene Blends", Polymer Engineering and Science, 2007. (Cited in EP Search Report).

Chinese Search Report dated Mar. 26, 2014, for CN 201180015343X, and English translation thereof.

METHOD FOR PRODUCING POLYPROPYLENE-BASED RESIN FOAMED BLOW-MOLDED ARTICLE

TECHNICAL FIELD

The present invention relates to a method for producing a polypropylene-based resin foamed blow-molded article.

BACKGROUND ART

Hitherto blow molding technique has been used for development of foamed blow-molded articles having a foam layer. Various methods have been thus proposed for production of foamed blow-molded articles. For example, there is known a method which includes melting and kneading a base resin and a blowing agent in an extruder, extruding the molten mixture through a die to obtain a foamed parison, sandwiching the foamed parison between molds, and subjecting the parison to blow molding.

Foamed blow-molded articles obtained by such a method are excellent in heat insulation property and light weight and, therefore, may be utilized for applications, such as automobile parts, receptacles, ducts and electric appliance parts, that require these properties. Especially, because hollow foamed blow-molded articles of a polypropylene-based resin have excellent heat resistance and excellent balance between their lightness in weight and rigidity, they are expected to be utilized as air conditioner ducts for automobiles.

However, a general polypropylene-based resin, which is a straight-chained crystalline resin and which undergoes a significant change in its melt properties at its foaming temperatures, is difficult in itself to expand to form a low apparent density molding. Even when a foamed parison is obtained by extrusion foaming of such a general polypropylene-based resin, it is still difficult to blow-mold the foamed parison into a complicated shape. In this circumstance, when a polypropylene-based resin is used as a base resin, obtained is only a foamed blow-molded article having a simple shape and an extremely low expansion ratio.

With a view toward solving the above problem, the present applicant proposes a method for producing a foamed blow-molded article using, as a base resin, a high melt tension polypropylene-based resin (HMSPP) having a specific melt tension and a specific melt flow rate (Patent Document 1). With this technique, it becomes possible to produce a polypropylene-based resin foamed blow-molded article having a wide range of apparent density. Among HMSPPs, those which have a branched structure show especially excellent foamability and, additionally, a foamed parison obtained therefrom shows excellent blow moldability.

In a blow molding process, since a parison is sandwiched and blow-molded between molds, a parting line is generally formed as a result of nipping and pressing by the molds on a periphery of the molded article with protruding fins being formed along the parting line in a large amount. Such fins are removed to obtain a final blow-molded article. The removed fins are generally pulverized and optionally further repelletized for use as a recycled raw material. Thus, the recycled raw material is used as a part of the raw material for the production of blow-molded articles.

When HMSPP having a branched structure is used as a raw material in blow molding, however, the viscoelastic property thereof tends to change due to cleavage of branched chains which is caused by heat and shear. As a consequence, the melt properties such as melt tension are apt to be deteriorated. Thus, depending upon the extrusion conditions, there is caused a case in which the melt tension and melt flow rate of HMSPP no longer meet the above-described specific requirements after it has been extruded. Therefore, when the melt properties of a recycled raw material are significantly deteriorated and when the blending amount of the recycled raw material is excessively large, the foamability and moldability are deteriorated so that it is not easy to obtain a foamed blow-molded article having a complicated shape and a low apparent density. Thus, there is a room for improvement in this respect.

The present applicant further proposes a technique for obtaining a foamed molded article having a high expansion ratio and a beautiful appearance by using a mixture of HMSPP, a recycled HMSPP raw material having specific melt properties and a general polypropylene-based resin in a specific blending ratio (Patent Document 2).

Additionally, the present applicant proposes a technique for producing a foamed blow-molded article having a thickness of 1-5 mm, a density of 0.35-0.65 $g/cm^3$ and a uniform thickness by using a polypropylene-based resin having a specific equilibrium compliance and a specific swell, such as a mixture of HMSPP with its recycled raw material or a recycled raw material of HMSPP (Patent Document 3).

The production technique disclosed in Patent Documents 2 and 3 makes it possible to use an HMSPP recycled raw material for producing polypropylene-based resin foamed blow-molded articles.

PRIOR ART

Patent Document

Patent Document 1: International Publication WO99/28111
Patent Document 2: Japanese Patent Publication JP-A-2004-122488
Patent Document 3: Japanese Patent Publication JP-A-2007-62364

SUMMARY OF THE INVENTION

Problems to be Solved by the Invention

A foamed blow-molded article is lighter in weight as compared with a conventional solid blow-molded article when the thickness is the same with each other. Further, the foamed blow-molded article has a merit that it can be made lighter in weight than a solid blow-molded article by controlling the apparent density and thickness thereof when the rigidity is the same with each other. Thus, foamed blow-molded articles made of a polypropylene-based resin as its base resin begin to be used as an air conditioner duct for automobiles.

Incidentally, in view of the problem of global warming due to emission of warming gases, reduction of carbon dioxide and the like in the exhaust gases is one of the important problem in the field of automobile industry. Thus, as a method for reducing emission of carbon dioxide from automobiles, reduction of fuel consumption of automobiles is being pushed ahead by weight lightening thereof.

In view of the foregoing background, automobile parts are desired to be made much more lighter in weight. Thus, ducts of a foamed blow-molded body with good light weight property are now desired to be far more lighter in weight. Air conditioner ducts for vehicles, however, intrinsically have a complicated shape. Further, the body structure of automobiles is more restricted so as to improve aerodynamic characteristics thereof while ensuring comfort of the car's occupants. As a consequence, there is a demand for ducts which have a more complicated shape and which can be installed in a limited space.

In order to achieve weight lightening of a foamed blow-molded article, it is necessary to further reduce the density and thickness of the foamed blow-molded article. As the apparent density becomes lower and the thickness becomes smaller, however, it is more difficult to uniformly inflate the foamed parison in the blow molding stage with the result that the thickness accuracy of the obtained molded article tends to be deteriorated. Moreover, it is more difficult to obtain a foamed blow-molded article having a high thickness accuracy, as the shape thereof becomes more complicated. In view of these background, much higher foam blow moldability is now required in the foam blow molding technology.

Also, when a foamed blow-molded article has a complicated shape, fins are naturally formed in an increased amount. Therefore, when the fins are used as a recycled raw material, the proportion of the recycled raw material in the raw material becomes high. This may cause a reduction of the foamability and blow moldability of the foamed parison and, hence, may cause a tendency that the desired expansion ratio is not easily obtained and a foamed blow-molded article having high thickness accuracy is not easily obtained.

The present invention has as its object the provision of a method for producing a polypropylene-based resin foamed blow-molded article that can improve foamability and blow moldability of a foamed parison as compared with conventional production method and can produce a molded article having excellent uniformity of wall thickness over a wide range of its density, notwithstanding that the article has much lower apparent density and/or much smaller thickness than ever before, that the shape of the article is complicated and that a recycled raw material is used in a high blending ratio.

Means for Solving the Problems

In accordance with the present invention, there are provided methods for producing a polypropylene-based resin foamed blow-molded article as shown below:

[1] A method for producing a polypropylene-based resin foamed blow-molded article, comprising extruding a foamable molten resin, obtained by kneading a polypropylene-based resin and a physical blowing agent, through a die to form a foamed parison in a softened state, placing the foamed parison between molds, and blow molding the foamed parison, wherein said polypropylene-based resin comprises a polypropylene-based resin (A) that meets requirements (1) to (3) shown below and a polypropylene-based resin (B) that meets requirement (4) shown below, when the polypropylene-based resins (A) and (B) are each subjected to dynamic viscoelasticity measurement in which an oscillation strain is applied thereto at a temperature of 190° C., and wherein a mixing ratio by weight (A:B) of the resin (A) to the resin (B) is 100:0.5 to 100:5, requirement (1): storage modulus G' is less than $5.0 \times 10^{-2}$ MPa at an angular frequency ($\omega$) of 100 rad/sec, requirement (2): slope between two points [log G' at log $\omega$=0] and [log G' at log $\omega$=2] is 0.5 to 0.7, requirement (3): loss tangent (tan δ) at angular frequency ($\omega$) of 1 rad/sec is 1.0 to 2.0, and requirement (4): loss tangent (tan δ) at angular frequency ($\omega$) of 1 rad/sec is less than 1.0.

[2] The method for producing a polypropylene-based resin foamed blow-molded article as recited in above [1], wherein the polypropylene-based resin (B), when subjected to dynamic viscoelasticity measurement in which an oscillation strain is applied thereto at a temperature of 190° C., meets the following requirements (5) and (6):

requirement (5): storage modulus G' is less than $5.0 \times 10^{-2}$ MPa at an angular frequency ($\omega$) of 100 rad/sec, requirement (6): slope between two points [log G' at log $\omega$=0] and [log G' at log $\omega$=2] is 0.3 or more and less than 0.5.

[3] The method for producing a polypropylene-based resin foamed blow-molded article as recited in above [1] or [2], wherein the foamed blow-molded article has a foam layer with an apparent density of 0.1 to 0.6 g/cm$^3$ and an average thickness of 1 to 10 mm.

Effect of the Invention

According to the process of the present invention, a polypropylene-based resin having specific dynamic viscoelastic property is admixed to a high melt tension polypropylene-based resin (HMSPP) with a specific dynamic viscoelastic property or its recycled resin which has been conventionally used for the production of polypropylene-based resin foamed blow-molded articles. By this, foamability and blow moldability of a foamed parison can be improved so that a molded article having excellent uniformity of wall thickness over a wide range of its density can be obtained notwithstanding that the article has much lower apparent density and/or much smaller thickness than ever before, that the shape of the article is complicated and that a recycled raw material is used in a high blending ratio.

EMBODIMENTS OF THE INVENTION

A method for producing a polypropylene-based resin foamed blow-molded article according to the present invention will be described in detail below. The present invention relates to a method for producing a foamed blow-molded article, characterized in that a product obtained by mixing a polypropylene-based resin (A) having specific dynamic viscoelastic property with a small amount of a polypropylene-based resin (B) having a specific dynamic viscoelastic property is used as a base resin for the production of a foamed blow-molded article. A general method for producing a foamed blow-molded article using a polypropylene-based resin as a base resin will be described below with reference to FIG. 1 and FIG. 2.

Figure 1:
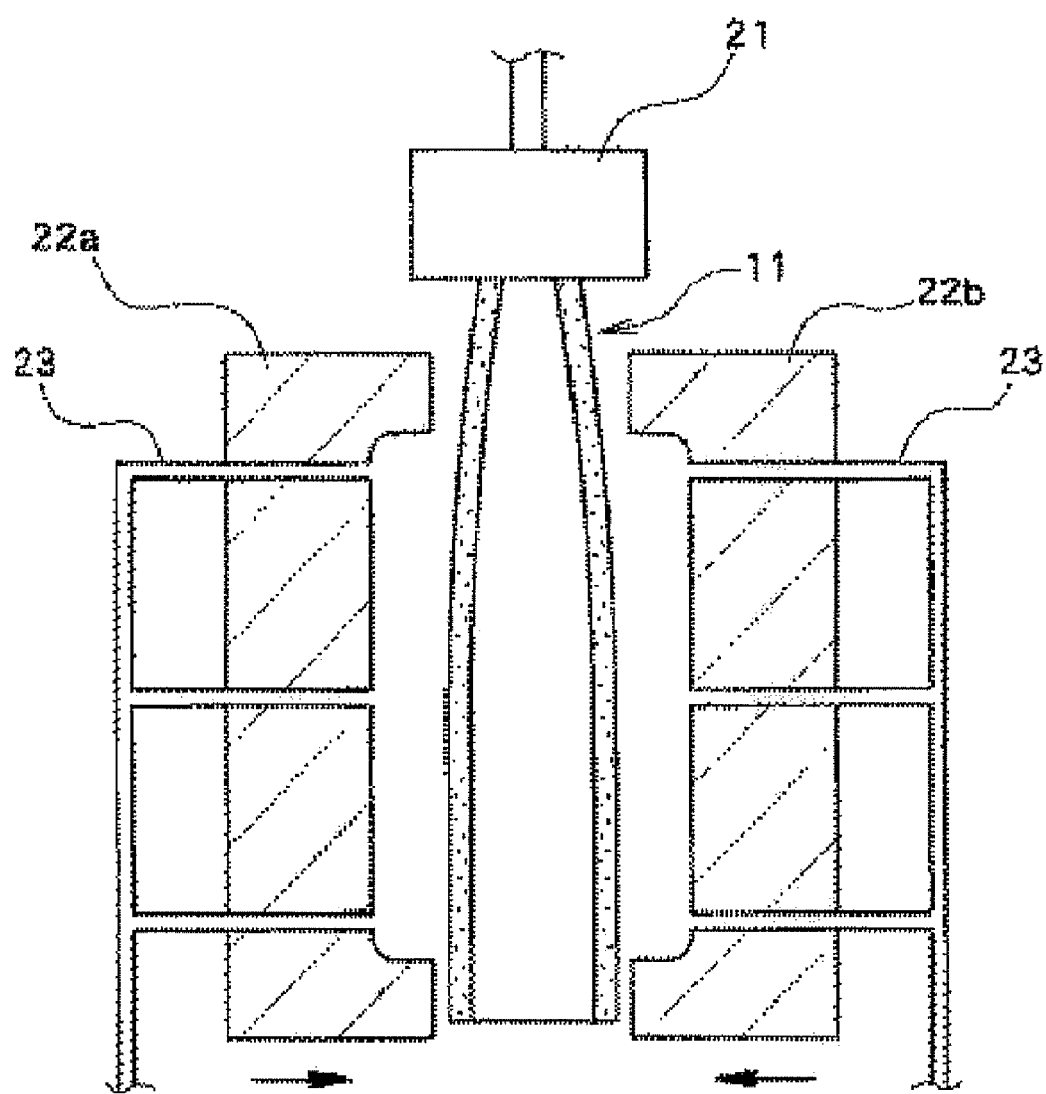
FIG. 1 is an explanatory view schematically illustrating an example of a method of the production of a foamed blow-molded article.
Figure 2:
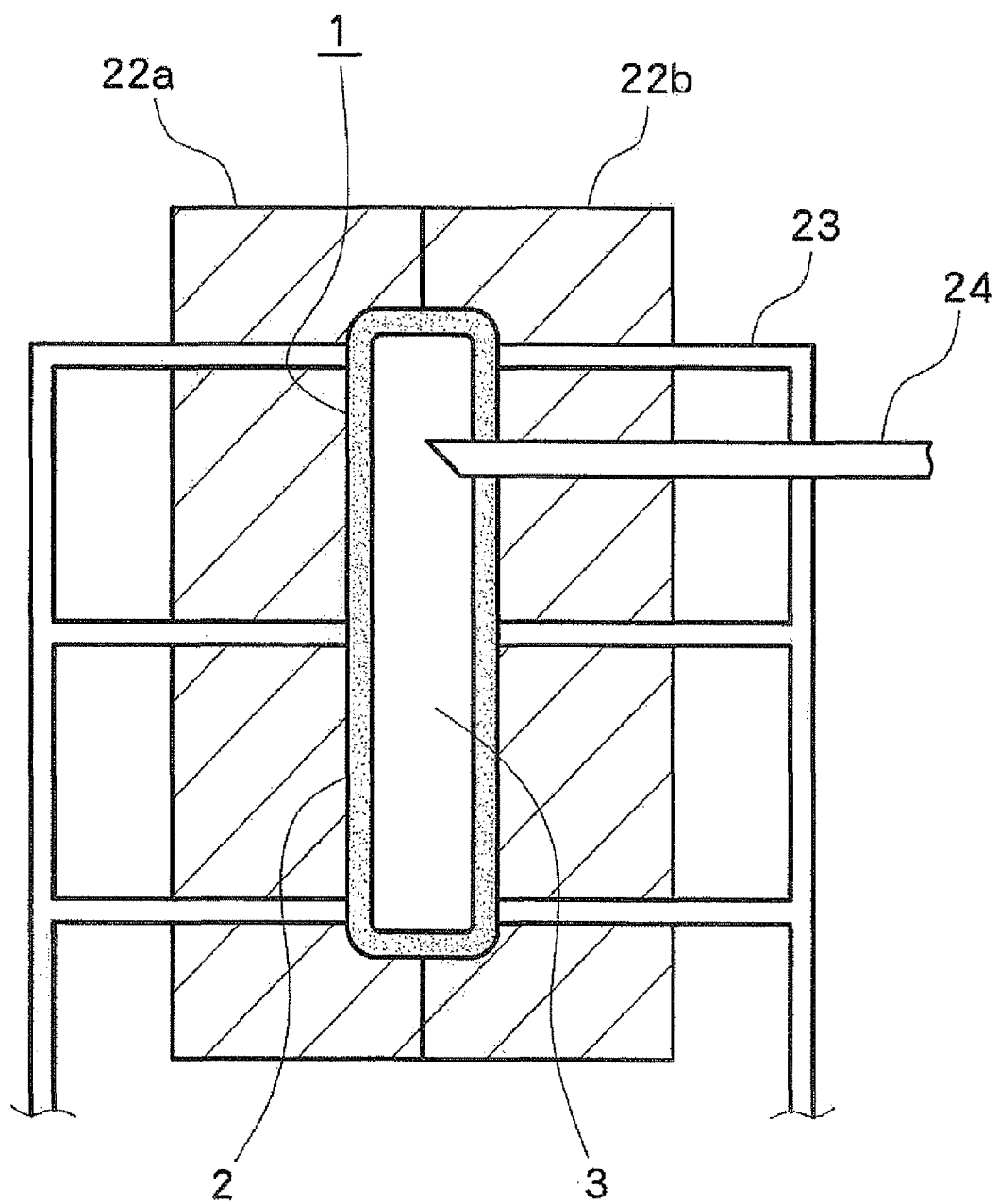
FIG. 2 is an explanatory view schematically illustrating an example of a method of the production of a foamed blow-molded article.

As shown in FIG. 1, the base resin and a physical blowing agent are fed to an extruder (not shown) and kneaded there to form a foamable molten resin, the resulting foamable molten resin being extruded through a die lip of a die 21 to obtain a tubular foamed parison 11. The foamed parison 11 in a softened state is placed between split-type mating molds having two molds 22a and 22b that are located just beneath the die, while blowing pre-blow air (a gas such as air for laterally expanding the parison or for preventing the inside surfaces of the parison from adhering to each other) into the parison By closure of the molds, the foamed parison 11 is sandwiched between the molds 22a and 22b. Subsequently, as shown in FIG. 2, a blow pin 24 is inserted into the foamed parison 11 and blow air (a gas such as air for blow-molding the parison) is blown from the blow pin 24 into the parison 11 to press the outer surface of the parison 11 against the inside wall of the molds. Thus, the foamed parison is blow-molded into a shape conforming to the shape of the mold to obtain a hollow foamed blow-molded article 1. After molding, the molded article is cooled while maintaining a wall 2 of the molded article in close contact with the mold by holding the pressure of a space 3 inside the molded article and/or by suction of the molded article from the mold side. Thereafter, the molds are opened to take out the foamed blow molded article 1.

General production conditions for production of foamed blow-molded articles will be next described in detail below. Generally, the following conditions for production of a foamed blow-molded articles are adopted, though the production conditions vary depending upon the kind of the base resin, the desired apparent density and average thickness of the molded articles and the shape of the molded articles.

The blowing agent added to the polypropylene-based resin for the formation of the foamed parison is a physical blowing agent. As the physical foaming agent, there may be mentioned, for example, aliphatic hydrocarbons such as propane, n-butane, isobutane, n-pentane, isopentane, n-hexane and isohexane, alicyclic hydrocarbons such as cyclopentane and cyclohexane, halogenated hydrocarbons such as methyl chloride, ethyl chloride, 1,1,1,2-tetrafluoroethane and 1,1-difluoroethane, alcohols such as methanol and ethanol, ethers such as dimethyl ether, diethyl ether and methyl ethyl ether, and inorganic substance capable of being used as a physical blowing agent such as carbon dioxide, nitrogen, argon and water. These physical blowing agents may be used singly or in combination of two or more thereof. The preferred physical blowing agent is one which contains an inorganic-type physical blowing agent such as nitrogen or carbon dioxide in an amount of at least 20% by weight, more preferably at least 50% by weight.

The amount of the physical blowing agent is suitably determined in consideration of the kind of the blowing agent and the desired apparent density (expansion ratio). For example, in order to obtain a molded article having an average apparent density of 0.1 to 0.6 g/cm$^3$ using carbon dioxide as the blowing agent, the amount of carbon dioxide is generally 0.05 to 0.5 mol per 1 kg of the base resin.

A cell controlling agent, such as an inorganic substance (e.g. talc and calcium carbonate) or a chemical blowing agent (e.g. sodium hydrogen carbonate or a mixture of sodium hydrogen carbonate and citric acid), may be incorporated into the base resin, if necessary. The cell controlling agent may be used in the form of a master batch together with a thermoplastic resin which is the same kind of the base resin constituting the foamed parison. The cell controlling agent is generally used in an amount of 0.05 to 10 parts by weight per 100 parts by weight of the base resin.

A melt viscosity of a foamed parison plays an important role in prevention of draw down of the foamed parison due to its own weight and in obtainment of a foamed blow-molded article having a complicated shape. The melt viscosity of the foamed parison may be controlled by selecting an appropriate base resin and by adjusting the temperature at which a foamable molten resin is extruded. The suitable extrusion temperature may be properly determined in consideration of the kind and amount of the blowing agent. When polypropylene is used as the base resin and carbon dioxide is used as the blowing agent, for example, it is preferable to control the parison extrusion temperature within a range of about 158 to 180° C.

When the discharge rate of a foamed parison is excessively high, however, there is a possibility that, due to excessive shear heat generation, the obtained foamed blow-molded article has considerably poor thickness accuracy and, occasionally, the foamed parison undergoes breakage of its cell structure and resulting shrinkage prior to the blow molding. When the discharge rate is excessively slow, on the other hand, there is a possibility that sufficient pressure cannot be held in the die to cause premature foaming within the die and, hence, failure to obtain a foamed parison having a closed cell structure. Additionally, there is a possibility that the foamed parison is cooled and extensibility is reduced before the blow molding to cause deterioration of the thickness accuracy of the obtained foamed blow-molded article. From this point of view, the discharge rate per unit area of the die lip aperture is preferably adjusted to about 50 to 300 kg/h·cm$^2$. It is preferred that an accumulator be disposed between the extruder and the die 21 or within the die for reasons of easiness in adjustment of the discharge rate within the above range.

It is also preferred that a time period for laterally expanding the extruded foamed parison be provided before the extruded foamed parison is sandwiched by the closure of the split molds. When the time period from the completion of the extrusion of the foamed parison until the start of closure of the split molds (mold closure retarding time) is excessively short, the lateral expansion of the foamed parison cannot sufficiently proceed so that the obtained foamed blow-molded article is apt to have non-uniform wall thickness. When such a time period is excessively long, on the other hand, there is a possibility that molding failure is brought about due to excessive draw down of the foamed parison and reduction of extensibility of the foamed parison. From this point of view, it is preferred that the mold closure retarding time be controlled within a range of 0.2 to 1 second.

In a foam blow molding process, the parison is in a foaming state. Therefore, when the pressure of blow air is excessively high, the cells are destroyed by the pressure so that the desired foamed blow-molded article cannot be obtained. When the blow air pressure is excessively low, on the other hand, it becomes not possible to shape the molded product in conformity with the mold as is the case with the ordinary non-foam blow molding. From this point of view, it is preferred that the blow air used has a pressure in the range of about 0.1 to 0.6 MPa(G) (G means "gauge" pressure) at the source.

In a foam blow molding process, a low blow air pressure is used as described above. Even with such a low blow air pressure, by evacuating the space between the outer surface of the foamed parison placed in the mold and the inner surface of the mold from the mold side using vacuum, it is possible to bring the foamed parison into close contact with the inner surface of the mold and to shape the product in conformity with the mold. In this case, it is preferred that the vacuum pressure be adjusted within a range of about −0.05 to −0.1 MPa(G).

The temperature of the split molds is determined in consideration of a balance between the formability of the foamed parison, in particular the formability of that portion of the foamed parison which has a high blow ratio, and the cooling efficiency. Generally, the temperature is preferably adjusted within a range of about 25 to 50° C.

In the process of the present invention, a single layer foamed parison may be blow molded to form a foamed blow-molded article composed only of a foam layer. Alternatively, if desired, an additional layer as a surface skin layer may be laminated on one or both sides of the foamed layer to form a multi-layered structure as long as the intended object of the present invention is not adversely affected. As the additional layer there may be mentioned, for example, a thermoplastic resin layer, a woven fabric layer, a non-woven fabric layer, a metal foil layer and a rubber layer. The thermoplastic resin layer may be a foamed layer or a non-foamed layer.

As a method for laminating a surface skin layer on outside of a foam layer, there may be mentioned a method in which the surface skin layer is previously mounted on inner wall of the split molds, and a foamed parison is then fed into the molds and blow-molded. Also, a multi-layered foamed blow-molded article having a thermoplastic resin surface skin layer provided outside and/or inside of a foam layer may be prepared by the following method. Namely, base resins that constitute respective layers are each melted and kneaded in separate extruders. These melted mixtures are combined into a single stream in a die and extruded into a lower pressure zone to obtain a multi-layered parison. The parison is then blow molded to obtain the desired article.

When a foamed parison is formed by extruding a melt of a base resin, an additive or additives such as a flame retardant, a fluidity improver, a weatherability agent, a colorant, a thermal stabilizer, a filler, an antistatic agent, and an electrical conductivity imparting agent may be incorporated into the base resin that constitutes the foam layer or into a base resin of an additional layer laminated on the foam layer, as needed.

Described next is a polypropylene-based resin used in the process of the present invention. As the polypropylene-based resin used in the present invention, there may be mentioned, for example, a polypropylene homopolymer, a propylene-ethylene copolymer, a propylene-butene copolymer and a propylene-ethylene-butene terpolymer.

In general, extrusion foaming of a crystalline thermoplastic resin is carried out at a temperature near the melting point of the resin. Since a polypropylene-based resin has a high crystallization degree and undergoes a great viscosity change at temperatures near the temperature that is suited for extrusion foaming, the temperature range that is suited for foaming is very narrow. Thus, the polypropylene-based resin is a resin that poses difficulty in obtaining a good foamed body by extrusion foaming. Description will be made below of viscoelastic properties that are needed to overcome the above problems of a polypropylene-based resin and to obtain an extrusion foamed body of a polypropylene-based resin.

In the production of an extrusion foamed body of a polypropylene-based resin, the elasticity of the polypropylene-based resin in the cell forming stage immediately after the extrusion as well as the rate of elasticity change of the polypropylene-based resin during the growth of the cells play important role. Namely, when a foamable molten resin containing a blowing agent is extruded from a die, the blowing agent dissolved in the resin under pressurized condition is separated to form cells. The cells grow as the blowing agent flows into the cells from the resin surrounding the cells. The amount of deformation of the resin is large at an initial stage of the cell growth and gradually decreases with the growth of the cells. Finally, the growth of the cells stops so that the cells are fixed. The rate of the elasticity change accompanying the growth of the cells is important.

At the initial stage of foaming, the deformation amount of the resin per unit time is large. At this time, when the elasticity of the resin is excessively high, cells do not easily form. In order to form cells, it is preferred that the elasticity of the resin be low, in some extent, in the region where the deformation amount of the resin is large, namely that a storage modulus G' have a small value, in some extent, in a high angular frequency side when the resin is subjected to dynamic viscoelasticity measurement in which an oscillation strain is applied to the resin in a molten state (this will be occasionally simply referred to as "dynamic viscoelasticity measurement"). As the cells inflate and the foaming proceeds, the deformation amount of the resin decreases. In this case, if the elasticity of the resin greatly decreases, namely if the rate of the elasticity change is excessively high, the cells will not be able to be maintained and the cells will be broken. On the other hand, if the rate of elasticity change is small and the elasticity of the resin hardly changes, namely if the elasticity of the resin is excessively high even when the amount of deformation of the resin becomes small, cells will be prevented from growing to cause difficulty in obtaining a foamed body having a desired expansion ratio, when the desired expansion ratio is low. In this case, when the desired expansion ratio is very high, the cells can sufficiently grow. Thus, it is preferable to use a resin whose elasticity moderately changes in response to the amount of deformation thereof in order to maintain the grown cells and to obtain a desired expansion ratio.

In general, there is a relationship between the above-described slope of the storage modulus G' of a straight chain polypropylene-based resin and its molecular weight. As the molecular weight of a straight chain polypropylene-based resin increases, the amount of change in the storage modulus G' against a change of the angular frequency tends to be small. Since a polypropylene-based resin of a high molecular weight type shows an excessively high value of storage modulus G' in a high angular frequency side, however, cells are not easily formed at the time of extrusion with the result that a good foamed body is not obtainable. When the molecular weight is small, on the other hand, cells are easily formed because the storage modulus G' has a small value. However, since the amount of change in the storage modulus G' against a change of the angular frequency is excessively large, it is not possible to maintain the cells with the result that a good foamed body is not obtainable, either.

As described above, a polypropylene-based resin having excellent extrusion foamability is preferably one which gives a small storage modulus G' value in a high angular frequency side and shows such a dynamic viscoelastic behavior that a change of the storage modulus G' is moderate against a change of an angular frequency, when the resin is measured for its dynamic viscoelasticity. As a polypropylene-based resin showing such a dynamic viscoelastic behavior, there may be mentioned a high melt tension polypropylene-based resin (HMSPP) having branches in its molecule and a recycled raw material thereof.

Description will be next made of the polypropylene-based resin (A) used as a main component in the present invention. The polypropylene-based resin (A) is a resin that has been hitherto used for the production of polypropylene-based resin foamed blow-molded articles and that shows dynamic viscoelasticity properties satisfying the requirements (1) and (2) shown below.

Requirement (1):

The resin, when subjected to dynamic viscoelasticity measurement in which an oscillation strain is applied thereto at a temperature of 190° C., shows storage modulus G' of less than $5.0 \times 10^{-2}$ MPa at an angular frequency ($\omega$) of 100 rad/sec. In Requirement (1), the angular frequency ($\omega$) of 100 rad/sec corresponds to deformation of the base resin at its relatively high deformation rate, namely at the time the extruded parison starts foaming. The fact that the storage modulus G' is less than $5.0 \times 10^{-2}$ MPa at such a time means that the resistance of the resin at the start of foaming is not excessively high. Namely, Requirement (1) shows a degree of easiness in forming cells of the foamed parison. When the storage modulus G' is excessively high, the elastic property is so high that cells cannot be formed. From this point of view, the storage modulus G' is preferably less than $4.0\times10^{-2}$ MPa, more preferably less than $3.0\times10^{-2}$ MPa. On the other hand, when the storage modulus G' at an angular frequency ($\omega$) of 100 rad/sec is excessively low, it becomes difficult to retain the resin pressure within the die so that foaming starts within the die, i.e. so called inside foaming phenomenon occurs. Therefore, good foamed body is not obtainable. For this reason, the lower limit of the storage modulus G' is preferably generally about $2.0\times10^{-2}$ MPa.

Requirement (2):

The resin, when subjected to dynamic viscoelasticity measurement in which an oscillation strain is applied thereto at a temperature of 190° C., shows a slope between two points [log G' at log $\omega$=0] and [log G' at log $\omega$=2] of 0.5 to 0.7.

In Requirement (2), a large slope indicates that the resin undergoes a great change in elasticity as the angular frequency decreases. When the slope of the storage modulus G' is less than 0.5, the growth of the cells is inhibited. Too large a slope above 0.7, on the other hand, brings about breakage of the cells due to excessively large change in elasticity of the resin during the growth of the cells.

Incidentally, the slope of the storage modulus G' may be determined as a slope of a straight line passing through two points on a graph prepared by plotting the logarithm of the storage modulus G' on the ordinate against the logarithm of the angular frequency ($\omega$) on the abscissa.

As the polypropylene-based resin that show the viscoelastic behavior satisfying the above Requirements (1) and (2), there may be mentioned, for example, HMSPP having a branched structure in its molecular chain. Specific examples of HMSPP include "WB130" (trade name) and "WB135" (trade name) both manufactured by Borealis Inc., and "PF814" (trade name) manufactured by Basell Inc.

In an ordinary extrusion foam molding process such as for forming an extrusion foamed sheet, the foaming step is followed only by a cooling and solidifying step. Good extrusion foam products may be obtained by mere use of the polypropylene-based resin having the above viscoelastic properties.

In contrast, in a foam blow molding process, after a foamed parison has been formed by extrusion foaming of a resin in a molten sate, it is necessary to blow-mold the foamed parison before it is cooled and solidified. Further, in an ordinary blow molding process in which a solid (non-foamed) parison is blow-molded, it is relatively easy to uniformly expand the parison as a whole, because the parison is a thick walled body. In contrast, in a foam blow molding process, because the parison is foaming, it is necessary that each of thin cell walls defining the foaming cells should be uniformly stretched during the blow molding step in order to uniformly expand the parison.

In the conventional foam blow molding process, it is possible to obtain a foamed blow-molded article having excellent wall thickness uniformity by using the polypropylene-based resin (A) showing the above-described viscoelastic properties. However, when a foamed blow-molded article has an especially complicated shape or when a recycled raw material obtained by collecting fins formed during the molding stage is used in a large blending ratio, mere use of the polypropylene-based resin (A) showing the above-described viscoelastic properties has been found to be insufficient to obtain a foamed blow-molded article having excellent wall thickness uniformity In a polypropylene-based resin, the viscous property is generally more dominant at a low angular frequency side. The resin, when subjected to dynamic viscoelasticity measurement in which an oscillation strain is applied thereto at a temperature of 190° C., gives a loss tangent (tan $\delta$), which is a ratio G"/G' of the loss modulus G" to the storage modulus G', of 1.0 or more at angular frequency (a) of 1 rad/sec. Among such resins, HMSPP that has been conventionally suitably used for extrusion foaming shows a loss tangent (tan $\delta$) of 1.0 to 2.0 at an angular frequency ($\omega$) of 1 rad/sec (Requirement (3)).

The present inventors have found that in a foam blow molding process, mere consideration of the above-described viscoelastic properties is insufficient and that the viscoelastic properties of a resin in a low an angular frequency side have a great influence upon the blow moldability. In the process of the present invention, the polypropylene-based resin (A) is blended with a small amount of the polypropylene-based resin (B) that shows specific viscoelastic properties in a low angular frequency side, and the blend is used as a base resin. As a result, the blow moldability of the foamed parison has been significantly improved.

The polypropylene-based resin (B) used in the process of the present invention meets Requirement (4) as follows:

Requirement (4):

The resin, when subjected to dynamic viscoelasticity measurement in which an oscillation strain is applied thereto at a temperature of 190° C., shows a loss tangent tan $\delta$, which is a ratio G"/G' of the loss modulus G" to the storage modulus G', of less than 1.0 at angular frequency ($\omega$) of 1 rad/sec.

The property as a viscous body is predominant as the loss tangent tan $\delta$ becomes larger, while the property as an elastic body is predominant as the loss tangent tan $\delta$ becomes smaller. It is considered that an angular frequency ($\omega$) of 1 rad/sec resembles the rate of strain at the time a foamed parison is blow-molded. Therefore, it is believed that, because the property as an elastic property is prevailing at such a low angular frequency ($\omega$), each of the cell walls can be uniformly stretched and the parison can more uniformly expand without breakage of the cells during the blow molding step. Additionally, it is believed that, because a small amount of such a specific polypropylene-based resin that shows an extremely small tan $\delta$ in a low angular frequency side is dispersed in the polypropylene-based resin (A) having a branched structure, a network structure is formed with the results that local breakage of the cells at a terminal stage of the foaming can be prevented and shrinkage of the foamed parison can be prevented.

It is inferred that through the foregoing mechanism such specific effects are achieved by the addition of a small amount of the polypropylene-based resin (B). In particular, by using the polypropylene-based resin (A) together with a small amount of the polypropylene-based resin (B) which shows a loss tangent tan $\delta$ of less than 1.0 at an angular frequency ($\omega$) of 1 rad/sec, the cells are not easily broken by blow air during the blow molding stage and, further, the foamed parison has an increased elasticity to permit uniform expansion of the foamed parison during the blow molding stage. As a consequence, the uniformity of the wall thickness of the obtained molded article is improved. From this point of view, a tan $\delta$ is desired to be as small as possible and is preferably less than 0.9. The lower limit of tan $\delta$ is about 0.6.

It is also preferred that the polypropylene-based resin (B) meet Requirements (5) and (6) shown below.

Requirement (5):

The resin, when subjected to dynamic viscoelasticity measurement in which an oscillation strain is applied thereto at a temperature of 190° C., shows storage modulus G' of less than $5.0\times10^{-2}$ MPa at an angular frequency ($\omega$) of 100 rad/sec.

Requirement (5) requires that, similar to Requirement (1) for the polypropylene-based resin (A), the resistance at the start of foaming is not excessively high. From this point of view, the storage modulus G' is preferably less than $4.0 \times 10^{-2}$ MPa, more preferably less than $3.0 \times 10^{-2}$ MPa. The lower limit of the storage modulus G' is preferably generally about $1.5 \times 10^2$ MPa.

Requirement (6):

The resin, when subjected to dynamic viscoelasticity measurement in which an oscillation strain is applied thereto at a temperature of 190° C., shows slope between two points [log G' at log ω=0] and [log G' at log ω=2] of 0.3 or more and less than 0.5.

Requirement (6) requires that the polypropylene-based resin (B) shows smaller change in elasticity against an increase of an angular frequency (ω) as compared with Requirement (2) for the polypropylene-based resin (A), i.e. the polypropylene-based resin (8) shows a smaller decrease in resistance against a displacement change as compared with the polypropylene-based resin (A). The resin having such viscoelastic properties, when used by itself, is not suited for extrusion foaming to obtain an apparent density of 0.1 g/cm³ or more. When the resin is added in a small amount to the polypropylene-based resin (A) and when the mixture is extruded and foamed within the above apparent density range, however, the foamability can be improved. Especially, when its recycled raw material is used in a large amount, the foamability is significantly improved. From this point of view, the above-described slope is more preferably 0.4 or less.

As used herein, the dynamic viscoelasticity of a polypropylene-based resin is measured as follows. The dynamic viscoelasticity measurement is carried out using as a measuring instrument a dynamic viscoelasticity measuring device (DYNAMIC ANALYZER Model SR200 manufactured by Rheometric Scientific F. E. Ltd.) of a stress control type within a linear viscoelastic region. When the dynamic viscoelasticity measurement of a polypropylene-based resin is carried out up to the maximum frequency of 100 rad/sec at 190° C. in the stress control mode, a stress within the range of $3 \times 10^{-5}$ to $2 \times 10^{-3}$ MPa provides the linear region. The dynamic viscoelasticity measurement herein is carried out with a stress of $5 \times 10^{-6}$ MPa.

A polypropylene-based resin is first press-molded at a temperature of 200° C. and a pressure of 10 MPa for 5 minutes into a resin plate with a thickness of about 2 mm. A sample in the form of a disc with a diameter of 25 mm is prepared from the resin plate. The sample is sandwiched between parallel plates with a diameter of 25 mm of the dynamic viscoelasticity measuring device and is heated to 190° C. and allowed to stand for about 10 minutes in a nitrogen atmosphere. Then, the gap between the parallel plates is narrowed and adjusted to 1.6 mm. The molten resin exuded between the parallel plates is removed. Thereafter, storage modulus G' and loss modulus G" corresponding to angular frequency (ω) are measured while changing the angular frequency (ω).

In the process of the present invention a mixed resin obtained by blending 0.5 to 5 parts by weight of the polypropylene-based resin (B) with 100 parts by weight of the polypropylene-based resin (A) must be used a raw material polypropylene-based resin. When the amount of the polypropylene-based resin (B) is excessively small, it is not possible to obtain the effect of improving foamability and blow moldability of the foamed parison. When the amount of the polypropylene-based resin (B) is excessively large, there is a possibility that control of the foaming state becomes difficult due to excessively high elastic property of the foamed parison and that inclusion of corrugations is apt to be caused during the blow molding step due to formation of significant corrugations in the foamed parison. From this point of view, the lower limit of the amount of the polypropylene-based resin (B) is preferably 1 part by weight, more preferably 1.5 parts by weight, while the upper limit of the amount of the polypropylene-based resin (B) is preferably 4.5 parts by weight, more preferably 4 parts by weight A method for blending the polypropylene-based resins (A) and (B) is not specifically limited. The polypropylene-based resin (B) may be directly added to and mixed with the polypropylene-based resin (A). Alternatively, the polypropylene-based resin (B) may be first formed into a master batch using a resin such as another polypropylene-based resin, the resulting master batch being admixed to the polypropylene-based resin (A) in an amount so that the proportion of the resin (B) falls with the above-specified range.

When two or more kinds of polypropylene-based resins are used in combination as the polypropylene-based resin (A), the resin (A) meets these requirements, if each of them meets Requirements (1) to (3). Even if one or more of them do not meet Requirements (1) to (3), however, the resin (A) still meets the requirements as long as the average that is obtained by geometrically averaging the viscoelastic properties of them while taking respective blending amounts into consideration, meets Requirements (1) to (3).

It is preferred that the polypropylene-based resin (A) have a melt tension (MT) at 230° C. of 1.5 cN or more, more preferably 2 cN or more, still more preferably 3 cN or more. When the melt tension is excessively low, draw down of the foamed parison increases and the cells thereof tend to be deformed or broken. Therefore, there is a possibility that the obtained molded article has non-uniform wall thickness with the results that the mechanical strength and heat insulating property thereof are deteriorated. When the melt tension is excessively high, on the other hand, there is a possibility that a thin-walled molded article is difficult to be produced and uniformity in wall thickness is deteriorated. For this reason, the upper limit of the melt tension is generally 40 cN, preferably 35 cN, more preferably 30 cN.

It is further preferred that the polypropylene-based resin (A) have a melt flow rate (MFR) at 230° C. of 2 g/10 min or more, more preferably 3 g/10 min or more. When the melt flow rate is excessively small, it is necessary to increase the resin temperature at the extrusion foaming stage. An increase of the extrusion temperature causes a reduction of the melt tension of the molten resin at the foaming stage, breakage of the cells and formation of open cells. As a result, it becomes difficult to produce foamed molded articles having a high closed cell content. When the melt flow rate is excessively high, on the other hand, draw down becomes significant so that foamed molded articles having a uniform wall thickness cannot be obtained. For this reason, the upper limit of the melt flow rate is preferably 20 g/10 min, more preferably 10 g/10 min.

When two or more kinds of polypropylene-based resins are used in combination as the polypropylene-based resin (A), it is desirable that each of them meets MT and MFR of the above specified ranges. When one or more of the polypropylene-based resins among them do not meet MT and MFR of the above specified ranges, it is preferred that the average obtained by geometrically averaging each of MT and MFR of them while taking respective blending amounts in consideration meet the above specified ranges.

It is further preferred that a ratio (B/A) of MFR of the polypropylene-based resin (B) at 230° C. to MFR of the polypropylene-based resin (A) be in the range of 0.2 to 5, more preferably 0.5 to 5, since the dispersibility of the polypropylene-based resin (B) in the polypropylene-based resin (A) is significantly improved and the foamability and blow moldability of the foamed parison become much more excellent.

The melt tension (MT) is a melt tension as measured according to ASTM D1238 and may be measured using Capirograph 1D (manufactured by Toyo Seiki Seisaku-Sho, Ltd.). Concretely, a cylinder having a cylinder diameter of 9.55 mm and a length of 350 mm and an orifice having a nozzle diameter of 2.095 mm and a length of 8.0 mm are used. The cylinder and the orifice are set at a temperature of 230° C. A resin specimen in a required amount is charged into the cylinder and held therein for 4 minutes. The molten resin is then extruded in the form of a string through the orifice at a piston speed of 10 mm/minute. The extruded resin string is put on a tension-detecting pulley having a diameter of 45 mm and is taken up on a take-up roller while increasing the take-up speed at a constant take-up acceleration rate such that the take-up speed increases from 0 m/minute to 200 m/minute through a period of 4 minutes to measure the maximum tension immediately before the string breaks. The reason for adopting a time period of 4 minutes until the take-up speed reaches 200 m/minute from 0 m/minute is to suppress thermal deterioration of the resin and to improve the reproducibility of the measured values. The above measurement is carried out for ten different samples. From the obtained ten measured maximum values, the largest three values and the smallest three values are excluded. The arithmetic mean of the rest four maximum values is the melt tension (cN) as used for the purpose of the present invention.

When the resin string does not break up to the take-up speed of 200 m/minute in the above method for the measurement of the melt tension, then the melt tension (cN) is as measured by the take-up operation at a constant take-up speed of 200 m/minute. More concretely, in the same manner as that described above, the molten resin is extruded in the form of a string, and the extruded resin string is put on a tension-detecting pulley and taken up on a take-up roller while increasing the take-up speed at a constant take-up acceleration rate such that the take-up speed increases from 0 m/minute to 200 m/minute through a period of 4 minutes. When the take-up speed of 200 m/minute is reached, recording of the melt tension data is started and continued for 30 seconds. From the obtained tension load curve (melt tension (ordinate) vs. time (abscissa)) for a measuring period of 30 seconds, the maximum tension (Tmax) and minimum tension (Tmin) are determined. The arithmetic mean (Tave) of the maximum tension (Tmax) and minimum tension (Tmin) is the melt tension as used for the purpose of the present invention.

The Tmax as used herein is a value obtained by dividing a sum of the tension values of the peaks (mountains) detected in the tension load curve by the number of the peaks, while the Tmin as used herein is a value obtained by dividing a sum of the tension values of the dips (valleys) detected in the tension load curve by the number of the dips. It is without saying that the above measurement should be carried out such that inclusion of air bubbles in the string is prevented as much as possible at the time of extrusion of the molten resin in the string form through the orifice. When a measuring sample is prepared from a foamed molded article, the hollow foamed molded article is heated and defoamed by heating in a vacuum oven. In this case, the defoaming conditions should be at a temperature higher than the melting point of the polypropylene-based resin constituting the base resin of the foamed blow-molded article (e.g. 230° C.), and under a reduced pressure.

As used herein, "melt flow rate" (MFR) refers to flow rate as measured according to JIS K7210 (1999) at a temperature of 230° C. and a load of 2.16 kg.

The base resin may additionally contain an additional component, such as a polyethylene resin (e.g., a high density polyethylene resin, a low density polyethylene resin and a linear low density polyethylene), a thermoplastic elastomer (e.g., a styrene-butadiene-styrene block copolymer and a hydrogenated product thereof), an ethylene-propylene rubber and a polystyrene-based resin, as long as the desired objects and effects of the present invention can be fulfilled. The amount of the additional component is generally 20% by weight or less, preferably 15% by weight or less, more preferably 10% by weight or less.

The polypropylene-based resin (B) used in the method of the present invention may be produced by, for example, polymerizing propylene by itself or copolymerizing propylene with another monomer such as ethylene or α-olefin with 4 or more carbon atoms in two or more stages to obtain a straight-chain polypropylene-based resin having controlled molecular weight and molecular weight distribution. More specifically, as disclosed in international publication No. WO2005/097842, the method includes two or more polymerization stages in which a polypropylene-based resin having a relatively high molecular weight is formed in the absence of hydrogen in the first stage, and a polypropylene-based resin having a low molecular weight as compared with the polypropylene-based resin obtained in the first stage is formed in the second and succeeding stages. A "multistage polymer" is produced in above-described two or more polymerization stages. The polypropylene-based resin (B) may be commercially available from Prime Polymer Co., Ltd.

The foamed blow-molded article obtained by the method of the present invention preferably has an apparent density of 0.1 to 0.6 g/cm$^3$, more preferably 0.15 to 0.5 g/cm$^3$. When the apparent density is within the above range, the foamed blow-molded article has excellent balance between its lightness in weight and its mechanical strength.

As used herein, the "apparent density" of a foamed blow-molded article refers to a density as determined by dividing the weight [g] thereof by the volume [cm$^3$] thereof.

The foamed blow-molded article obtained by the method of the present invention preferably has an average thickness of 1 to 10 mm, more preferably 1.5 to 7 mm. When the average thickness is excessively small, there is a possibility that the foamed blow-molded article is not imparted with properties such as heat insulating property that are inherent to a foam. Too large a thickness, on the other hand, causes difficulty in production of the foamed blow-molded article.

The average thickness is measured as follows. A foamed blow-molded article is measured for its thickness at five (5) positions including a position near the midpoint in the longitudinal direction thereof (generally in the extrusion direction of the foamed parison), two positions near both ends thereof and two positions near the centers between the midpoint and the both ends (a position where the foamed blow-molded article has a special shape, such as a location designed for fitting engagement, should be avoided). In each of these five positions, thickness measurement is done at six (6) locations which are equally spaced from each other along the perimeter thereof that is perpendicular to the longitudinal direction. Thus, thickness measurement is done at 30 locations in total. The average thickness is the arithmetic mean of the twenty eight (28) measured thickness values excluding the maximum and minimum values. Incidentally, when the position to be measured is, for example, a position of a duct provided with a discharge aperture, the above thickness measurement cannot be made. In such a case, the perimeter of that position except the discharge aperture is divided into six equal length sections and thickness measurement is done at a center portion of each of the six sections.

The foamed blow-molded article produced by the method of the present invention preferably has a closed cell content of 60% or more. When the closed cell content is excessively small, there is a possibility that excellent heat insulating property and mechanical strength may not be obtained. From this point of view, the closed cell content of the foamed blow-molded article is more preferably 70% or more, still more preferably 80% or more.

As used herein, the closed cell content refers to a value as calculated by the formula (7) below upon determining the true volume $V_x$ according to Procedure C of ASTM D-2856-70 (reapproved 1976). In this case, when the required volume cannot be obtained from one sample, two or more samples may be combined together to get as close the required volume as possible.

$$\text{Closed cell content (\%)} = (V_x - V_a(\rho_f/\rho_s)) \times 100/(V_a - V_a(\rho_f/\rho_s)) \quad (7)$$

wherein
$V_x$ represents a true volume (cm$^3$) of the specimen, which corresponds to a sum of a volume of the resin and a volume of closed cells,
$V_a$ represents an apparent volume (cm$^3$) of the specimen which is calculated from the outer dimension thereof,
$\rho_f$ represents an apparent density (g/cm$^3$) of the specimen, and
$\rho_s$ represents a density (g/cm$^3$) of the base resin constituting the specimen.

It is preferred that the foamed molded article produced by the method of the present invention have an average cell diameter "a" in the thickness direction of 0.1 to 0.8 mm, more preferably 0.2 to 0.6 mm. It is also preferred that a ratio a/b of the average cell diameter "a" to an average cell diameter "b" in the extrusion direction (generally in the longitudinal direction) be 0.1 to 1.2, more preferable 0.2 to 1, still more preferably 0.3 to 0.8. It is further preferred that a ratio a/c of the average cell diameter "a" to an average cell diameter "c" in the direction perpendicular to the extrusion direction of the foamed blow-molded article be 0.1 to 1.2, more preferable 0.2 to 1, still more preferably 0.2 to 0.6.

When the average cell diameter "a" is within the above range, the foamed molded article has particularly excellent balance between heat insulating property, mechanical strength and appearance. The properties of the foamed blow-molded article, in particular heat insulating properties and mechanical properties such as compressive strength and bending strength are greatly influenced not only by the average cell diameter but also by the shape of cells thereof. Suitable cell shape varies with the desired performance to be achieved of the molded article. The cell deformation ratios a/b and a/c may be adjusted by controlling the draw down of the foamed parison and/or lateral expansion of the foamed parison during pre-blow step and also by controlling the pressure of the blow air in the blow molding step.

A used herein, the average cell diameter "a" in the thickness direction of a foamed blow-molded article refers to average cell diameter as measured by the following method. A vertical cross section taken in the direction perpendicular to the longitudinal direction of the foamed molded article is magnified and projected. On the projected image, a straight line extending through the entire thickness of the foamed blow-molded article is drawn. The number of cells that intersect this straight line is counted. The value computed by dividing the real length before magnification of this straight line by the count of the number of cells represents the cell diameter in the thickness direction of the molded article. The above measurement is carried out for the vertical cross section of each of the five (5) positions including a position near the midpoint in the longitudinal direction thereof, two positions near both ends thereof and two positions near the centers between the midpoint and the both ends (a position where the foamed blow-molded article has a special shape, such as a location designed for fitting engagement, should be avoided). In each of these five cross sections, measurement is done at six (6) locations which are equally spaced from each other along the perimeter thereof. The average cell diameter "a" is the arithmetic mean of the twenty eight (28) measured cell diameter values excluding the maximum and minimum values of the obtained 30 measured values.

Incidentally, when the position to be measured is, for example, a position of a duct provided with a discharge aperture, the above measurement cannot be made. In such a case, the perimeter of that position except the discharge aperture is divided into six equal length sections and cell diameter measurement is done at a center portion of each of the six sections. Further, when the location to be measured has cells that are excessively crushed or cells that are excessively elongated as compared with other locations to be measured, such a location should not be measured. Instead, any other location of the same cross section should be measured for the cell diameter.

The average cell diameter "b" in the longitudinal direction is measured by the following method. A vertical cross section taken in the longitudinal direction perpendicular to the circumferential direction of the foamed molded article is magnified and projected. On the projected image, a line segment (which may be a curved line) that bisects the thickness of the foamed blow-molded article and has a length corresponding to 10 mm of a real longitudinal length thereof before magnification is drawn. The number of cells that intersect this line is counted. The value computed by dividing the real length before magnification of this straight line by the equation:

$$\text{cell diameter (mm)} = 10/(\text{number of cells} - 1)$$

represents the cell diameter in the longitudinal direction of the molded article. The above measurement is carried out for each of the five (5) positions including a position near the midpoint in the longitudinal direction thereof, two positions near both ends thereof and two positions near the centers between the midpoint and the both ends (a position where the foamed blow-molded article has a special shape, such as a location designed for fitting engagement, should be avoided). In each of these five positions, measurement is done at six (6) locations which are equally spaced from each other along the perimeter thereof. The average cell diameter "b" is the arithmetic mean of the twenty eight (28) measured cell diameter values excluding the maximum and minimum values of the obtained 30 measured values. When the location to be measured has cells that are excessively crushed or cells that are excessively elongated as compared with other locations to be measured, such a location should not be measured. Instead, any other location of the same cross section should be measured for the cell diameter.

The average cell diameter "c" in the circumferential direction is measured by the following method. A vertical cross section taken in the direction perpendicular to the longitudinal direction of the foamed molded article is magnified and projected. On the projected image, a line segment (which may be a curved line) that bisects the thickness of the foamed blow-molded article and has a length corresponding to 10 mm of a real length thereof before magnification is drawn. The number of cells that intersect this line is counted. The value computed by dividing the real length before magnification of this straight line by the equation:

cell diameter (mm)=10/(number of cells−1)

represents the cell diameter in the circumferential direction of the molded article.

The above measurement is carried out for the vertical cross section of each of the five (5) positions including a position near the midpoint in the longitudinal direction thereof, two positions near both ends thereof and two positions near the centers between the midpoint and the both ends (a position where the foamed blow-molded article has a special shape, such as a location designed for fitting engagement, should be avoided). In each of these five cross sections, measurement is done at six (6) locations which are equally spaced from each other along the perimeter thereof. The average cell diameter "c" is the arithmetic mean of the twenty eight (28) measured cell diameter values excluding the maximum and minimum values of the obtained 30 measured values. When the location to be measured has cells that are excessively crushed or cells that are excessively elongated as compared with other locations to be measured, such a location should not be measured. Instead, any other location of the same cross section should be measured for the cell diameter.

The cell deformation ratio a/b may be calculated by dividing the average cell diameter "a" by the average cell diameter "b". The cell deformation ratio a/c may be calculated by dividing the average cell diameter "a" by the average cell diameter "c".

Example 1

The present invention will be next described in more detail by way of Examples and Comparative Examples. The kinds and physical properties of polypropylene-based resins used in Examples and Comparative Examples are shown in Tables 1 to 3, in which storage modulus G' at an angular frequency of 100 rad/sec, slope between points [G' at an angular frequency of 1 rad/sec] and [G' at an angular frequency of 100 rad/sec], loss tangent (tan δ) at angular frequency of 1 rad/sec, and melt tension (MT) and melt flow rate (MFR) at 230° C. of the polypropylene-based resins were measured by the methods described previously. In Table 1, *1 indicates a polypropylene-based resin that was obtained by repelletizing the polypropylene-based resin A1 at a resin temperature of 230° C. and a discharging rate of 50 kg/h using a twin screw extruder with an inside diameter of 47 mm, the resulting pellets being again subjected to repelletization under the same conditions as described above. In Table 3, *2 indicates that MT was unable to be measured at 230° C.

TABLE 1

| Code | Grade | Manufacturer | Molecular Chain | G'(ω = 100) [MPa] | Slope of G' | tanδ (ω = 1) | MT [cN] | MFR [g/10 min] |
| --- | --- | --- | --- | --- | --- | --- | --- | --- |
| A1 | WB135 | Borealis | branched | $3.3 \times 10^{-2}$ | 0.56 | 1.3 | 26 | 4.8 |
| A2 | *1 | — | branched | $2.4 \times 10^{-2}$ | 0.68 | 1.9 | 2.0 | 14 |
| A3 | PF814 | Basell | branched | $2.7 \times 10^{-2}$ | 0.52 | 1.1 | 20 | 3.2 |

TABLE 2

| Code | Manufacturer | Molecular Chain | G'(ω = 100) [MPa] | Slope of G' | tanδ (ω = 1) | MT [cN] | MFR [g/10 min] |
| --- | --- | --- | --- | --- | --- | --- | --- |
| B1 | Prime Polymer Co., Ltd. | straight chain | $2.2 \times 10^{-2}$ | 0.37 | 0.8 | 6.0 | 3.0 |

TABLE 3

| Code | Grade | Manufacturer | Molecular Chain | G'(ω = 100) [MPa] | Slope of G' | tanδ (ω = 1) | MT [cN] | MFR [g/10 min] |
| --- | --- | --- | --- | --- | --- | --- | --- | --- |
| C1 | BC8 | Japan Polypropylene Corporation | straight chain | $7.2 \times 10^{-2}$ | 0.58 | 1.5 | 4 | 2.0 |
| C2 | J700GP | Prime Polymer Co., Ltd. | straight chain | $3.8 \times 10^{-2}$ | 0.83 | 3.2 | 0.3 | 8.0 |
| C3 | FB3312 | Japan Polypropylene Corporation | straight chain | $3.5 \times 10^{-2}$ | 0.71 | 1.9 | (*2) | 3.2 |

Examples 1 to 6, Comparative Examples 1 to 8 and Reference Example 1

Polypropylene-based resins (kinds and blending amounts are shown in Table 4) and talc as a cell controlling agent were fed to an extruder having a diameter of 65 mm and melted and kneaded therein. Carbon dioxide ($CO_2$) was supplied under pressure to an intermediate portion of the extruder in an amount (mol/kg) shown in Table 4 per 1 kg of the polypropylene-based resins and kneaded together to form a foamable molten resin. The foamable molten resin was fed into an accumulator connected to the extruder. The foamable molten resin was then extruded through an annular die, provided at an end of the accumulator, into an ambient pressure zone and allowed to foam to form a foamed parison. While blowing pre-blow air into the foamed parison, the foamed parison was sandwiched between two split molds disposed just beneath the die. Blow air was blown into the foamed parison from a blow pin, while evacuating through vents provided in the molds, to press the outer surface of the foamed parison against the inner surface of the molds and to blow-mold the foamed parison. After cooling, the molds were opened and the blow-molded product was taken out of the molds. Protruding fins and pockets were removed from the blow-molded product to give a foamed blow-molded article. Foamed parison forming conditions are summarized in Table 4. The temperature of the foamed parison extruded refers to a temperature as measured for a foamed parison, immediately after having been extruded from the die, at a position 100 mm below the tip of the die. Thus, the measurement is carried out before the blow molding of the foamed parison using an IR thermometer (Model SK-870011 manufactured by Sato Keiryoki Mfg. Co., Ltd.). The distance between the surface of the parison and the thermometer was 50 mm.

Molds having a maximum length of 650 mm and a maximum width of 180 mm were used as a mold for forming a foamed blow-molded article. The mold had an average expanding ratio of 1.51 and an average blow ratio of 0.36. The "expanding ratio" herein refers to a ratio (La/Lb) of a half length Lb of a peripheral length of the molded product to a length of the straight line (La) which is perpendicular to the extrusion direction of the foamed parison and which extends between the opposing parting lines of the mold. The average expanding ratio is an arithmetic mean of seven expanding ratio values obtained for seven sections of the mold cavity that are equally divided in the extrusion direction. In general, as the expanding ratio increases, the uniformity in thickness tends to be reduced. The "blow ratio" herein refers to a ratio (Lc/La) of the maximum length (Lc) of a straight line, which extends between the above-described straight line La and the molded body in the direction perpendicular to the molded body, to the length of the straight line La. The average blow ratio is an arithmetic mean of the blow ratio values obtained for the above-described seven sections. When the expanding ratio is the same, the uniformity in thickness tends to be reduced as the blow ratio increases.

Various physical properties such as apparent density, average thickness, foamability and moldability of the foamed blow-molded articles obtained in Examples and Comparative Examples are summarized in Table 5.

TABLE 4

| | Polypropylene-based Resin | | | | | | Cell Controlling Agent | | Blowing Agent | | Temperature of Parison |
|---|---|---|---|---|---|---|---|---|---|---|---|
| | PP(A) | | PP(B) | | PP(C) | | | | | | |
| | Kind | Amount Part by weight | Kind | Amount Part by weight | Kind | Amount Part by weight | Kind | Amount Part by weight | Kind | Amount mol/kg | Extruded ° C. |
| Example 1 | A1/A2 = 20/80 | 100 | B1 | 3 | | | Talc | 0.2 | $CO_2$ | 0.18 | 170 |
| Example 2 | A1/A2 = 20/80 | 100 | B1 | 4 | | | Talc | 0.2 | $CO_2$ | 0.18 | 170 |
| Example 3 | A1/A2 = 20/80 | 100 | B1 | 2 | | | Talc | 0.2 | $CO_2$ | 0.18 | 170 |
| Example 4 | A1/A2 = 20/80 | 100 | B1 | 1 | | | Talc | 0.2 | $CO_2$ | 0.09 | 172 |
| Example 5 | A2 | 100 | B1 | 4 | | | Talc | 0.2 | $CO_2$ | 0.09 | 172 |
| Example 6 | A3 | 100 | B1 | 3 | | | Talc | 0.2 | $CO_2$ | 0.18 | 170 |
| Comp. Ex. 1 | A1/A2 = 20/80 | 100 | | | | | Talc | 0.2 | $CO_2$ | 0.18 | 168 |
| Comp. Ex. 2 | A1/A2 = 20/80 | 100 | | | | | Talc | 0.2 | $CO_2$ | 0.09 | 170 |
| Comp. Ex. 3 | A2 | 100 | | | | | Talc | 0.2 | $CO_2$ | 0.09 | 170 |
| Comp. Ex. 4 | A1/A2 = 20/80 | 100 | B1 | 7 | | | Talc | 0.2 | $CO_2$ | 0.18 | 174 |
| Comp. Ex. 5 | A1/A2 = 20/80 | 100 | | | C1 | 4 | Talc | 0.2 | $CO_2$ | 0.09 | 174 |
| Comp. Ex. 6 | A1/A2 = 20/80 | 100 | | | C2 | 4 | Talc | 0.2 | $CO_2$ | 0.09 | 170 |
| Comp. Ex. 7 | A1/A2 = 20/80 | 100 | | | C3 | 4 | Talc | 0.2 | $CO_2$ | 0.09 | 172 |
| Comp. Ex. 8 | | | B1 | 4 | C3 | 100 | Talc | 0.2 | $CO_2$ | 0.09 | 174 |
| Ref. Example 1 | A3 | 100 | | | | | Talc | 0.2 | $CO_2$ | 0.18 | 166 |

TABLE 5

| | Evaluation of Foamed Parison | | | | | | Evaluation of Foamed Blow-Molded Article | | | | |
|---|---|---|---|---|---|---|---|---|---|---|---|
| | | | | | | Closed | Average Cell Diameter | Cell Deformation Ratio | | Wall | |
| | Shrinkage | Corrugation | Draw Down | Apparent Density g/cm³ | Average Thickness mm | Cell Content % | a mm | a/b | a/c | Thickness Uniformity | Hole Formation |
| Example 1 | A | A | A | 0.16 | 5.0 | 87 | 0.3 | 0.4 | 0.3 | A | A |
| Example 2 | A | A | A | 0.14 | 6.0 | 83 | 0.3 | 0.4 | 0.3 | A | A |

TABLE 5-continued

| | Evaluation of Foamed Parison | | | Evaluation of Foamed Blow-Molded Article | | | | | |
|---|---|---|---|---|---|---|---|---|---|
| | | | | Apparent Density g/cm³ | Average Thickness mm | Closed Cell Content % | Average Cell Diameter a mm | Cell Deformation Ratio | Wall Thickness Uniformity | Hole Formation |
| | Shrinkage | Corrugation | Draw Down | | | | | a/b | a/c | | |
| Example 3 | A | A | A | 0.19 | 4.5 | 75 | 0.4 | 0.5 | 0.4 | A | A |
| Example 4 | A | A | A | 0.28 | 2.7 | 68 | 0.5 | 0.6 | 0.4 | A | A |
| Example 5 | A | A | A | 0.31 | 2.5 | 70 | 0.3 | 0.4 | 0.3 | A | A |
| Example 6 | A | A | A | 0.11 | 7.0 | 90 | 0.6 | 0.6 | 0.4 | AA | A |
| Comp. Ex. 1 | B | A | B | 0.35 | 3.0 | 40 | 0.6 | 0.3 | 0.2 | C | B |
| Comp. Ex. 2 | A | A | B | 0.37 | 2.6 | 55 | 0.6 | 0.3 | 0.2 | C | B |
| Comp. Ex. 3 | B | A | B | 0.36 | 2.4 | 56 | 0.4 | 0.2 | 0.2 | C | B |
| Comp. Ex. 4 | A | B | A | 0.13 | 12.0 | 76 | 0.6 | 0.6 | 0.7 | C | A |
| Comp. Ex. 5 | B | A | B | 0.37 | 3.0 | 50 | 0.7 | 0.3 | 0.3 | C | B |
| Comp. Ex. 6 | B | A | B | 0.38 | 2.5 | 43 | 0.5 | 0.3 | 0.2 | C | B |
| Comp. Ex. 7 | B | A | B | 0.36 | 3.0 | 45 | 0.5 | 0.3 | 0.3 | C | B |
| Comp. Ex. 8 | B | A | B | 0.34 | 3.0 | 56 | 0.5 | 0.4 | 0.4 | C | B |
| Ref. Example 1 | A | A | A | 0.13 | 6.0 | 86 | 0.6 | 0.6 | 0.4 | A | A |

Apparent Density:

The apparent density was calculated by dividing the weight (g) of a foamed blow-molded article by the volume (cm³) thereof which was measured by immersing the foamed blow-molded article in water.

Average Wall Thickness:

The average wall thickness of a foamed blow-molded article was measured by the method described previously.

Closed Cell Content:

As a measuring device, Air Comparison Pycnometer (Model-930) manufactured by Toshiba Beckmann Inc. was used. In each of the five positions that were subjected to the above-described wall thickness measurement of the foamed blow-molded article, the closed cell content was measured according to the measuring method described previously. An arithmetic mean of the measured values is the closed cell content of the foamed blow-molded article.

Average Cell Diameter and Cell Deformation Ratio:

The average cell diameter "a" in the thickness direction of a foamed blow-molded article, average cell diameter "b" in the extrusion direction and average cell diameter "c" in the circumferential direction were determined by the method described previously. The average cell diameter "a" in the thickness direction and average cell diameter "c" in the circumferential direction were measured on each of the five vertical cross sections of the foamed blow-molded article, while the average cell diameter "b" in the extrusion direction was measured near those positions where the average cell diameters "a" and "c" were measured. Each cross section was magnified by 50 folds and projected. The average cell diameters were measured on the projected images.

Shrinkage:

Shrinkage was evaluated with naked eyes according to the following ratings:

A: No significant shrinkage of the foamed parison is seen during extrusion and after completion of the extrusion of the foamed parison.

B: Significant shrinkage of the foamed parison is seen during extrusion or after completion of the extrusion of the foamed parison.

Corrugation:

Corrugation was evaluated with naked eyes according to the following ratings:

A: Inclusion of corrugations does not occur in the blow molding stage.

B: Inclusion of corrugations occurs in the blow molding stage.

Draw Down:

Draw down tendency was evaluated according to the following ratings:

A: Significant draw down that adversely affects blow molding is not seen.

B: Significant draw down that adversely affects blow molding is seen.

Wall Thickness Uniformity:

The wall thickness uniformity of a foamed blow-molded article was evaluated according to the following ratings:

AA: Thickness variation coefficient Cv (%) of the molded article is 20% or less.

A: Thickness variation coefficient Cv (%) of the molded article is greater than 20% and 35% or less.

B: Thickness variation coefficient Cv (%) of the molded article is greater than 35% and 50% or less.

C: Thickness variation coefficient Cv (%) of the molded article is greater than 50%.

The variation coefficient Cv (%) is a value obtained by the formula:

$Cv$ (%)=(Standard variation (mm) of the thickness of the foamed blow-molded article)/(average thickness (mm) of the foamed blow-molded article)× 100, and represents a degree of variation of the thickness. The standard variation V of the thickness of the molded article is calculated according to the following formula (8):

$$V(\text{mm}) = \{\Sigma(T_i - T_{av})^2/(n-1)\}^{1/2} \quad (8)$$

In the formula (8), $T_i$ is a measured thickness value of each of the above-described thirty locations in each of which the average thickness has been measured, $T_{av}$ is the above-described average thickness, and n is the number of the measurement (namely, 30). Thus, the variation coefficient Cv can be determined from the following formula (9) on the basis of the formula (8):

$$Cv(\%) = (V/T_{av}) \times 100 \quad (9)$$

Formation of Holes:

Formation of holes was evaluated according to the ratings shown below. After full closure of the aperture of the obtained foamed blow-molded article, compressed air was blown into the molded article to check whether or not air was leaked through the side walls of the foamed blow-molded article.
A: No leakage is detected upon blowing of air.
B: Leakage is detected upon blowing of air.

EXPLANATION OF REFERENCE NUMERALS

1: Foamed blow-molded article
2: Wall
3: Space
11: Foamed parison
22a, 22b: Molds
23: Pipes for evacuation
24: Blow pin

The invention claimed is:

1. A method for producing a polypropylene-based resin foamed blow-molded article, comprising
extruding a foamable molten resin, obtained by kneading a polypropylene-based resin and a physical blowing agent, through a die to form a foamed parison in a softened state, placing the foamed parison between molds, and blow molding the foamed parison,
wherein said polypropylene-based resin comprises a polypropylene-based resin (A) that meets requirements (1) to (3) shown below and a polypropylene-based resin (B) that meets requirement (4) shown below, when the polypropylene-based resins (A) and (B) are each subjected to dynamic viscoelasticity measurement in which an oscillation strain is applied thereto at a temperature of 190° C., and
wherein a mixing ratio by weight (A:B) of the resin (A) to the resin (B) is 100:0.5 to 100:5,
requirement (1): storage modulus G' is less than $5.0 \times 10^{-2}$ MPa at an angular frequency ($\omega$) of 100 rad/sec,
requirement (2): slope between two points [log G' at log $\omega$=0] and [log G' at log $\omega$=2] is 0.5 to 0.7,
requirement (3): loss tangent (tan $\delta$) at angular frequency ($\omega$) of 1 rad/sec is 1.0 to 2.0, and
requirement (4): loss tangent (tan $\delta$) at angular frequency ($\omega$) of 1 rad/sec is less than 1.0.

2. A method for producing a polypropylene-based resin foamed blow-molded article as recited in claim 1, wherein the polypropylene-based resin (B), when subjected to dynamic viscoelasticity measurement in which an oscillation strain is applied thereto at a temperature of 190° C., meets the following requirements (5) and (6):
requirement (5): storage modulus G' is less than $5.0 \times 10^{-2}$ MPa at an angular frequency (w) of 100 rad/sec,
requirement (6): slope between two points [log G' at log $\omega$=0] and [log G' at log $\omega$=2] is 0.3 or more and less than 0.5.

3. A method for producing a polypropylene-based resin foamed blow-molded article as recited in claim 1, wherein the foamed blow-molded article has a foam layer with an apparent density of 0.1 to 0.6 g/cm$^3$ and an average thickness of 1 to 10 mm.

4. The method for producing a polypropylene-based resin foamed blow-molded article as recited in claim 1, wherein the polypropylene-based resin (A) has a branched structure.

5. The method for producing a polypropylene-based resin foamed blow-molded article as recited in claim 1, wherein the polypropylene-based resin (B) is a straight-chain polypropylene-based resin.

6. The method for producing a polypropylene-based resin foamed blow-molded article as recited in claim 1, wherein extruding the foamable molten resin comprises the step adjusting a discharge rate of the foamable molten resin to about 50 to 300 kg/h·cm$^2$.

7. The method for producing a polypropylene-based resin foamed blow-molded article as recited in claim 2, wherein extruding the foamable molten resin comprises the step adjusting a discharge rate of the foamable molten resin to about 50 to 300 kg/h·cm$^2$.

8. The method for producing a polypropylene-based resin foamed blow-molded article as recited in claim 3, wherein extruding the foamable molten resin comprises the step adjusting a discharge rate of the foamable molten resin to about 50 to 300 kg/h·cm$^2$.

9. The method for producing a polypropylene-based resin foamed blow-molded article as recited in claim 4, wherein extruding the foamable molten resin comprises the step adjusting a discharge rate of the foamable molten resin to about 50 to 300 kg/h·cm$^2$.

10. The method for producing a polypropylene-based resin foamed blow-molded article as recited in claim 5, wherein extruding the foamable molten resin comprises the step adjusting a discharge rate of the foamable molten resin to about 50 to 300 kg/h·cm$^2$.

* * * * *